United States Patent [19]

Aida et al.

[11] Patent Number: 5,223,566

[45] Date of Patent: * Jun. 29, 1993

[54] THERMOPLASTIC RESIN COMPOSITION FOR EXTRUSION MOLDING

[75] Inventors: Fuyuki Aida, Tokyo; Tsutomu Miyamoto, Ibaragi, both of Japan

[73] Assignee: Nippon Petrochemicals Company, Limited, Tokyo, Japan

[*] Notice: The portion of the term of this patent subsequent to Jun. 22, 2010 has been disclaimed.

[21] Appl. No.: 709,077

[22] Filed: May 30, 1991

Related U.S. Application Data

[63] Continuation of Ser. No. 545,339, Jun. 26, 1990, abandoned.

Foreign Application Priority Data

Jun. 28, 1989 [JP] Japan .................. 1-163648

[51] Int. Cl.$^5$ .................................................. C08K 3/34
[52] U.S. Cl. ........................... 524/451; 524/490; 524/570; 524/575.5; 524/584; 524/586; 525/331.7; 525/333.7; 525/375; 525/383; 525/385
[58] Field of Search ............ 524/451, 490, 570, 575.5, 524/584, 586; 525/331.7, 333.7, 383, 385, 375

[56] References Cited

U.S. PATENT DOCUMENTS

| | | |
|---|---|---|
| Re. 31,518 | 2/1984 | Fischer . |
| Re. 32,028 | 11/1985 | Fischer . |
| 3,806,558 | 4/1974 | Fischer . |
| 4,212,787 | 7/1980 | Matsuda et al. . |
| 4,247,652 | 1/1981 | Matsuda et al. . |
| 4,918,127 | 4/1990 | Adur et al. ............. 524/437 |

FOREIGN PATENT DOCUMENTS

| | | |
|---|---|---|
| 324278 | 7/1989 | European Pat. Off. .......... 524/87 |
| 1010549 | 11/1965 | United Kingdom . |

*Primary Examiner*—Melvyn I. Marquis
*Assistant Examiner*—Mark D. Sweet
*Attorney, Agent, or Firm*—Dilworth & Barrese

[57] ABSTRACT

A thermoplastic resin composition for extrusion molding superior in the balance of mechanical properties and moldability is obtained by using a partially crosslinked product obtained by dynamically heat-treating:

(A) 100-1 wt % of an α-olefin (co)polymer of $C_2$ to $C_8$;
(B) 0-99 wt % of a rubbery substance;
0.01-7 parts by weight, based on 100 parts by weight of the components (A)+(B), of at least one crosslinking agent selected from:
(C) a dihydroaromatic series compound or a polymer thereof,
(D) an ether series compound,
(E) a tetrahydroaromatic series compound, and
(F) a cyclopentane series compound; and
(G) 0.01-7 parts by weight of a polyfunctional monomer based on 100 parts by weight of the components (A)+(B).

10 Claims, No Drawings

THERMOPLASTIC RESIN COMPOSITION FOR EXTRUSION MOLDING

This is a continuation of copending application Ser. No. 07/545,339 filed on Jun. 26, 1990, now abandoned.

BACKGROUND OF THE INVENTION

The present invention relates to a thermoplastic resin composition for extrusion molding such as sheet molding, film molding, pipe molding, profile extrusion, or blow molding. More particularly, the present invention is concerned with a thermoplastic resin composition for extrusion such as sheet molding, film molding, pipe molding, profile extrusion, or blow molding, superior in the balance of dynamically heat-treating an -olefin (co)-polymer of $C_2$ to $C_8$ and, if desired, a rubbery substance in the presence of a specific closslinking agent and polyfunctional monomer. Examples of products obtained using the composition of the present invention include sheets for use in civil engineering and agricultural works, water-proof sheets, sheets for automobile interior materials typified by leather-like-sheets and instrument panel skin material; films formed by T-die method or inflation method; pipes such as corrugated pipes, lining pipes, straight pipe pipes, cheeses, hoses and elbows; profile extrusion such as mud guards; hollow containers such as duct hoses, bellows pipes, seasoning containers, shampoo containers and gasoline tanks; and automobile parts formed by various forming methods, including fender, door panel, protector, bumper fascia, energy absorber, air spoiler, side molding weather strip, shock absorber, dust boots, rack and pinion boots, rear finisher, sill, rear coater panel, engine hood, and trunk lid.

Thermoplastic resins, as materials superior in moldability, are utilized in a wide variety of industrial fields. Further the utilization field thereof has been expanded by blending thereof with various other resins and fillers for modification. And thermoplastic resin compositions are formed into various products, including sheets, films, pipes, profile-extrusion products and hollow products. Further, with diversified needs, there is now a demand for products having various characteristics namely, thermoplastic resin compositions having various characteristics. To meet this demand, attempts are being made more actively than before for modifying thermoplastic resins by blending them with various resins and fillers. At the same time, however, troubles caused by such blending are becoming more and more serious. For example, if a large amount of an inorganic filler is incorporated in a thermoplastic resin, the tensile elongation of the resulting composition will be deteriorated although it will be possible to improve the rigidity thereof. And if a thermoplastic resin is blended with a soft substance such as a rubbery substance, deterioration will result in point of heat resistance and mechanical strength although the improvement of impact resistance will be attainable. In order to minimize such deterioration of physical properties, there has been adopted a method of dynamically heat-treating a thermoplastic resin composition, allowing crosslinking to take place. By this method there is attained improvement of impact resistance, tensile strength and heat resistance, and rubbery properties are enhanced when rubber is incorporated in the composition. This is well known. Further, such blending, using not only inorganic fillers and rubbery substances but also other materials sometimes results in deteriorated surface appearance of shaped articles obtained because of incorporation therein of substances of different qualities. In such simple blends, their mechanical strength is somewhat improved but not effective, and there has been the problem of surface roughness.

An example of a method which utilizes a dynamic heat treatment is shown in Japanese Patent Publication No. 34210/1978 (U.S. Pat. No. 3,806,558). As shown therein, a free radical forming agent typified by an organic peroxide is generally used. Using organic peroxide non-crosslinking type resins such as polypropylene resins, as thermoplastic resins, is suitable for injection molding because the compositions obtained are superior particularly in fluidity. However, the organic peroxides remaining in the compositions deteriorate thermal stability and weathering resistance and undergo sudden thermal decomposition, resulting in that there occurs a molecular cutting reaction, thus leading to deterioration of mechanical properties such as yield tensile strength, bending strength and flexural modulus.

Moreover, in the case where such compositions are used in extrusion molding such as sheet molding, film molding, pipe molding, profile extrusion, or blow molding, there occurs deterioration of the anti drawdown characteristic, which leads to an unformable state in the extreme case. Besides, there arise such problems as surface roughness and deficient elongation of shaped articles. The conventional method in question is not applicable to organic peroxide crosslinking type resins such as polyethylene resins because an extreme crosslinking reaction proceeds and consequently the flow characteristics of the resulting compositions are deteriorated markedly. Or it is required to use an organic peroxide in an extremely small amount and thus the reaction control is very difficult. Also, an offensive odor of the shaped article obtained often causes a problem.

This conventional method further involves such problems as low stability and safety of a free radical forming agent during storage thereof and also during the dynamic heat treatment, as well as a thermal decomposition loss caused by the adhesion thereof to heated inner walls of a processing machine. It has been desired to solve this problem.

Thus, in the conventional simple blending method or crosslinking method for thermoplastic resins using crosslinking agents, the crosslinking agent exhibits drawbacks such as causing decomposition of the composition during the dynamic heat treatment, side reaction, offensive odor, or coloration, and hence the composition after the treatment cannot be said fully satisfactory in practical use. Therefore, improvements have been desired for obtaining superior thermoplastic resin compositions for extrusion molding such as sheet molding, film molding, pipe molding, profile extrusion, or blow molding.

It is the object of the present invention to provide a thermoplastic resin composition for extrusion molding such as sheet molding, film molding, pipe molding, profile extrusion, or blow molding, superior in the balance of mechanical properties and moldability.

SUMMARY OF THE INVENTION

Having made extensive studies along the above-mentioned object, the present inventors found out that a thermoplastic resin composition containing a partially crosslinked product obtained by dynamically heat-treating an α-olefin (co)polymer of $C_2$ to $C_8$ and/or a rubbery substance in the presence of a special crosslinking agent and a polyfunctional monomer was remarkably superior in the balance of mechanical properties and moldability as compared with compositions obtained by dynamic heat treatment using conventional crosslinking agents. On the basis of this finding we accomplished the present invention.

The present invention, in the first aspect thereof, resides in a thermoplastic resin composition for extrusion molding containing a partially crosslinked product obtained by dynamically heat-treating:

(A) 100-1 wt % of an α-olefin (co)polymer of $C_2$ to $C_8$;
(B) 0-99 wt % of a rubbery substance;
0.01-7 parts by weight, based on 100 parts by weight of the components (A)+(B), of at least one crosslinking agent selected from:
(C) a dihydroaromatic series compound or a polymer thereof,
(D) an ether series compound,
(E) a tetrahydroaromatic series compound, and
(F) a cyclopentane series compound; and
(G) 0.01-7 parts by weight of a polyfunctional monomer based on 100 parts by weight of the components (A)+(B).

The present invention, in the second aspect thereof, resides in a thermoplastic resin composition for sheet or film molding containing a partially crosslinked product obtained by dynamically heat-treating:

(A) 20-100 wt % of an ethylene (co)polymer and/or a polypropylene resin;
(B) 0-80 wt % of a rubbery substance;
0.01-7 parts by weight, based on 100 parts by weight of the components (A)+(B), of at least one crosslinking agent selected from:
(C) a dihydroaromatic series compound or a polymer thereof,
(D) an ether series compound,
(E) a tetrahydroaromatic series compound, and
(F) a cyclopentane series compound; and
(G) 0.01-7 parts by weight of a polyfunctional monomer based on 100 parts by weight of the components (A)+(B).

The present invention, in the third aspect thereof, resides in a thermoplastic resin composition for pipe molding, containing a partially crosslinked product obtained by dynamically heat-treating:

(A) 30-100 wt % of an ethylene (co)polymer, 0-70 wt % of a polypropylene resin, and/or
(B) 0-70 wt % of a rubbery substance;
0.01-7 parts by weight, based on 100 parts by weight of the components (A)+(B), of at least one crosslinking agent selected from:
(C) a dihydroaromatic series compound or a polymer thereof,
(D) an ether series compound,
(E) a tetrahydroaromatic series compound, and
(F) a cyclopentane series compound; and
(G) 0.01-7 parts by weight of a polyfunctional monomer based on 100 parts by weight of the components (A)+(B).

The present invention, in the fourth aspect thereof, resides in a thermoplastic resin composition for profile extrusion molding, containing a partially crosslinked product obtained by dynamically heat-treating:

(A) 30-100 wt % of an ethylene (co)polymer and/or a polypropylene resin;
(B) 0-70 wt % of a rubbery substance;
0.01-7 parts by weight, based on 100 parts by weight of the components (A)+(B), of at least one crosslinking agent selected from:
(C) a dihydroaromatic series compound or a polymer thereof,
(D) an ether series compound,
(E) a tetrahydroaromatic series compound, and
(F) a cyclopentane series compound; and
(G) 0.01-7 parts by weight of a polyfunctional monomer based on 100 parts by weight of the components (A)+(B).

The present invention, in the fifth aspect thereof, resides in a thermoplastic resin composition for blow molding, containing a partially crosslinked product obtained by dynamically heat-treating;

(A) 30-100 wt % of an ethylene (co)polymer and/or a polypropylene resin;
(B) 0-70 wt % of a rubbery substance;
0.01-7 parts by weight, based on 100 parts by weight of the components (A)+(B), of at least one crosslinking agent selected from:
(C) a dihydroaromatic series compound or a polymer thereof,
(D) an ether series compound,
(E) a tetrahydroaromatic series compound, and
(F) a cyclopentane series compound; and
(G) 0.01-7 parts by weight of a polyfunctional monomer based on 100 parts by weight of the components (A)+(B).

DETAILED DESCRIPTION OF THE INVENTION

The present invention will be described in detail hereinunder.

As examples of the α-olefin (co)polymer of $C_2$ to $C_8$ used as component (A) in the present invention, there are mentioned polyethylene resins, e.g. such ethylene polymers as high and medium density polyethylenes and high pressure process low-density polyethylenes and such ethylene-α-olefin copolymers (as the α-olefin comonomer there may used any of not only $C_3$-$C_8$ α-olefins but also $C_9$-$C_{12}$ α-olefins) as linear low-density polyethylenes and very low density polyethylenes, ethylene-unsaturated carboxylate copolymers, ethylene-carboxylic acid unsaturated ester copolymers, polypropylene resins, and such α-olefin polymers as poly-1-butene, poly-4-methyl-1-pentene and poly-1-hexene. These may be used each alone or as mixtures or copolymers thereof.

The "very-low density polyethylenes" referred to above indicate polyethylenes not higher than 0.910 g/cm$^3$ in density and exhibiting properties intermediate between linear low-density polyethylenes and ethylene-α-olefin copolymer rubbers.

For example, a specific ehtylene-α-olefin copolymer having a density of 0.860 to 0.910 g/cm$^3$ and a maximum peak temperature (Tm) of not lower than 50° C. as measured by differential scanning calorimetry (DSC) is prepared by polymerization using a catalyst comprising a solid catalyst component and an organoaluminium compound, the solid catalyst component containing magnesium and titanium. The said ethylene-α-olefin copolymer is a resin having both a highly crystalline portion of a linear low-density polyethylene and an amorphous portion of an ethylene-α-olefin copolymer rubber. High mechanical strength and heat resistance which are features of the former and rubbery elasticity and high low-temperature impact resistance which are features of the latter are well balanced in the resin in question. The use of this resin in the present invention affords a thermoplastic resin composition for extrusion into sheets, films, pipes, profile-extrusion products, hollow products, etc., superior in performance over a wide range. Thus, this resin is extremely useful.

Very-low density polyethylenes, having the above properties, can afford remarkably superior properties particularly when combined with crystalline polypropylenes. For example, in the case where it is desired to enhance the softness of a crosslinked composition comprising a crystalline polypropylene and a rubbery substance, the addition of a softening agent, increase of the amount of the rubbery substance, or the addition of a low-density polyethylene or a linear low-density polyethylene, will inevitably cause deterioration of heat resistance and mechanical strength, or other problems. On the other hand, the use of the foregoing very-low density polyethylene will not cause these problems but will make improvements in point of low-temperature impact resistance, elongation of parison, and anti-drawdown property.

As examples of the rubbery substance used in the present invention there are mentioned natural rubbers, isoprene rubber, butadiene rubber, styrene-butadiene random copolymer rubber (SBR), chloroprene rubber, nitrile rubber, butyl rubber, styrene-butadiene-styrene block copolymer (SBS), styrene-isoprene-styrene block copolymer (SIS), 1,2-polybutadiene rubber, ethylene-propylene-diene random copolymer (EPDM), and ethylene-$\alpha$-olefin copolymer rubbers typified by ethylene-$\alpha$-olefin random copolymer rubbers (as the $\alpha$-olefin comonomer there may be used any of not only $C_3$–$C_8$ $\alpha$-olefins but also $C_9$–$C_{12}$ $\alpha$-olefins). Particularly, ethylene-proprylene-diene random copolymer rubber and ethylene-$\alpha$-olefin random copolymer rubber are preferred. These two kinds of rubbers, as compared with the other rubbery substances, are superior in thermoplasticity, can be easily dispersed by melt-kneading, do not have any peculiar offensive odor in comparison with SBR, isoprene rubber, nitrile rubber or butadiene rubber, or can be obtained as pellets so can be weighed and handled easily at the time of blending. Also as to the type of the composition preparing apparatus, a larger degree of freedom is obtained in the selection thereof. Thus, the two kinds of rubbers in question have various advantages in operation. The rubbery substances exemplified above may be used each alone, or as a mixture of two or more thereof if necessary. As to the diene component contained in EPDM, there is no special limitation placed thereon. Any of those presently available, including ethylidene norbornene, dicyclopentadiene and 1,4-cyclohexadiene, is employable.

The dihydroaromatic series compound (C) used as a crosslinking agent in the present invention is a compound containing one or more aromatic rings, of which one aromatic ring is dihydrogenated. The aromatic ring as referred to herein indicates a ring structure having $4n+2$ (n is an integer) of $\pi$-electrons shown in the definition of aromaticity [see, for example, "Yuki Kagakuno Kiso," Tokyo Kagaku Dojin K.K. (1976), translated by Toshio Goto, pp.105-106, (Richard S. Mon-son & John C. Shelton, "Fundamentals of Organic Chemistry," MacGraw-Hill, Inc. (1974)]. Pyridine and quinoline are included as examples. Therefore, examples of the dihydroaromatic compounds used in the present invention include dihydro derivatives of quinoline. Further, the dihydroaromatic compound used in the present invention may contain a substituent group. Alkyl substituted compounds, as well as derivatives substituted with various elements and functional groups, are employable.

The dihydroaromatic series compound used in the invention can be prepared by a known chemical reaction. Examples of those available at present are 1,2-dihydrobenzene, cis-1,2-dihydrocatechol, 1,2-dihydronaphthalene, 9,10-dihydrophenanthrene, as well as 1,2-dihydroquinoline compounds such as 6-decyl-2,2,4-trimethyl-1,2-dihydroquinoline, 6-ethoxy-2,2,4-trimethyl-1,2-dihydroquinoline, and 2,2,4-trimethyl-1,2-dihydroquinoline. Polymers of these compounds are also employable.

Among the dihydroaromatic series compounds employable in the present invention there are included those which have heretofore been known as antioxdant agents (see, for example, Japanese Patent Publication No. 46661/1980), but these have been used not as crosslinking agents but together with conventional crosslinking agents such as sulfur compounds, organic peroxides, phenolic compounds and quinone dioxime compounds.

Thus, the prior art is lacking in the knowledge of the present invention, i.e., the knowledge that dihydroaromatic compounds and polymers exhibit crosslinking-reactivity, or the knowledge of the effect that a combined use of such dihydroaromatic compound and a polyfunctional monomer permits a mild crosslinking reaction to proceed.

The ether series compound (D) used as crosslinking agent in the present invention may be straight-chained or cyclic, or may contain a substituent group. Examples are cyclic ethers such as 1,3-dioxolan and 1,4-dioxane; straight chain ethers such as ethyl ether and isopropyl ether; non-aromatic cyclic vinyl ethers typified by 3,4-dihydro-2-pyran and 4H-chromene; furan derivatives typified by furfuryl alcohol, furfuryl aldehyde, benzofuran and furfuryl acetate; straight chain vinyl ether compounds typified by n-octadecyl vinyl ether and ethyl vinyl ether; enol ethers and enol esters of carbonyl compounds such as ketones, esters, lactones, aldehydes, amides and lactams typified by ketene acetal, isopropenyl acetate, vinyl acetate and 1-amino-1-methoxyethylene. These compounds may contain substituent groups. Alkyl substituted compounds as well as derivatives substituted with various elements and functional groups. And these compounds may be used each alone or as mixtures. Particularly, vinyl or alkenyl ethers are preferred.

The tetrahydroaromatic series compound (E) used as a crosslinking agent in the present invention indicates a compound in which at least one aromatic ring is tetrahydrogenated. The said aromatic ring has the same meaning as in the foregoing definition of aromaticity.

For example, furan, benzene and naphthalene are included, while pyran is excluded. Therefore, examples of the tetrahydroaromatic compound used in the present invention include tetrahydro derivatives of naphthalene. Further, the tetrahydroaromatic compound in question may contain a substituent group. Alkyl substituted compounds and derivatives substituted with various elements and functional groups are also employable. The tetrahydroaromatic compound used in the invention can be prepared by a known chemical reaction. Examples of those available at present include 1,2,3,4-tetrahydronaphthalene, tetrahydrobenzene and tetrahydrofuran. Polymers of these compounds are also employable.

The cyclopentane series compound used as a crosslinking agent in the present invention is a compound containing at least one cyclopentane, cyclopentene or cyclopentadiene skeleton. That is, the compound (F) is a five-membered compound whose ring is constituted by only carbon atoms. Examples include cyclopentane, cyclopentadiene, dicyclopentadiene, indene, indane, and fluorene. Of course, these compounds may contain substituent groups. Alkyl substituted compounds and derivative substituted with various elements and functional groups are employable. And these compounds may be used each alone or as mixtures.

In the present invention it is necessary to use the polyfunctional monomer (G) together with at least one crosslinking agent selected from the above components (C), (D), (E) and (F).

Examples of the polyfunctional monomer (G) include higher esters of methacrylic acid typified by trimethylolpropane trimethacrylate and ethylene glycol dimethacrylate; polyfunctional vinyl monomers typified by divinylbenzene, triallyl isocyanurate and diallyl phthalate; and bismaleimides typified by N,N'-m-phenylene bismaleimide and N,N'-ethylene bismaleimide. Particularly, bismaleimide compounds and di(meth)acrylate compounds are preferred because these compounds are highly reactive and the addition of polar groups leads to the improvement in dispersibility and receptivity of fillers such as inorganic fillers and flame retardants, e.g. metal oxides. These compounds may be used in combination of two or more.

In the present invention, a mixture consisting essentially of the components obtained above is heat-treated dynamically to afford a resin composition. The dynamic heat treatment means melt-kneading the said mixture to increase the boiling xylene insolubles content in the composition after the kneading in comparison with the value before the kneading. By this heat treatment there are attained the effects of the present invention. Generally, the higher the boiling xylene insolubles contents, the greater the improvement of various effects, including greatly improved impact resistance.

The temperature of the dynamic heat treatment is not lower than the melting point or the softening point of the thermoplastic resin and/or rubbery substance used and below the decomposition point thereof.

It is desirable that the melt kneading be carried out using a mixing machine which affords a high shear rate in order to facilitate the formation of radical in the mixture.

A main factor of increasing the boiling xylene insolubles content is the amount of the crosslinking agent used, which amount can be selected optionally. A suitable amount is selected according to the kind of the cross-linking agent used and that of the polyfunctional monomer used, or the apparatus and conditions for the melt kneading. Using an excess amount of a crosslinking agent will cause bleeding of the added component, coloration of the resulting composition, or increase of cost. An appropriate amount may be determined in consideration of these points. Actually, the amount of the crosslinking agent used and that of the polyfunctional monomer used are each usually in the range of 0.01 to 7, preferably 0.05 to 5, parts by weight based on 100 parts by weight of the components (A)+(B).

In the case of using a highly volatile crosslinking agent or polyfunctional monomer, it is desirable to remove unreacted monomer from a vent hole.

As the melt-kneading apparatus for performing the dynamic heat treatment there may be used any of known apparatus, including open type mixing rolls, non-open type Bumbury's mixer, extruder, kneader, and twin-screw extruder. Where the present invention is practised at the above proportions of the components, preferred conditions involve a kneading temperature in the range of 120° to 350° C. and a heat treatment time in the range of 20 seconds to 20 minutes.

In order to improve the moldability and flexibility there may be added a softening agent. Examples of the softening agent include mineral oil-based softening agents which are the same as the commonly-called extender oils used mainly for the improvement of processability during processing of rubber, for a quantity increasing effect, or for the improvement of dispersibility of filler. These are high-boiling petroleum components and are classified into paraffinic, naphthenic and aromatic oils. In the present invention, not only these petroleum distillates but also synthetic oils such as liquid polyisobutene are also employable. The amount of the softening agent used is not larger than 50 parts by weight based on 100 parts by weight of the components (A)+(B). An amount thereof exceeding 50 parts by weight will result in marked deterioration of strength and heat resistance. When the softening agent is to be added is not specially limited, but preferably it is added at the time of melt kneading of the thermoplastic resin.

The proportion of the $C_2$–$C_8$ α-olefin (co)polymer used in the present invention is 100 to 1 wt % and that of the rubbery substance is 0 to 99 wt %. Suitable polymer and rubbery substance may be determined according to the purpose of use of the resulting composition.

For example, when rigidity is required, the resin to be used is preferably polypropylene or a high or medium density polyethylene. Examples of employable polypropylenes include homopolymer and block and random copolymers of propylene. Particularly, when high rigidity and impact resistance are required, it is desirable to use a block copolymer. A homopolymer of propylene is poor in impact resistance and a random copolymer thereof is low in both rigidity and impact resistance. In point of the improvement of rigidity, the same can also be said of high and medium density polyethylenes. High-density polyethylenes are superior for use particularly in pipe extrusion and blow molding because of high melt tension.

Although high-density polyethylenes are poor in mechanical strength as compared with rigid polyvinyl chloride resin for pipes, their strength can be improved by being slightly crosslinked according to the method of the present invention. Besides, they are little deteriorated by light and heat, so can be processed safely without decomposition. High-density polyethylenes are also superior in chemicals resistance and are particularly suitable for forming pipes of large diameters. For the adjustment of hardness and for the improvement of impact resistance and of flexibility there may be added, as necessary, a high pressure process low-density polyethylene, a linear low-density polyethylene, a very-low density polyethylene, ethylene-carboxylic acid unsaturated ester copolymer, an ethylene-unsaturated carboxylate copolymer, a rubbery substance, or a softening agent. Also as to the base resin, there may be selected a resin according to the purpose of use of the resulting composition. For example, where melt tension is required, there may be used a high-density polyethylene as a resin retaining rigidity, and not polypropylene.

Where flexibility is required, it is desirable to use an ethylene-unsaturated carboxylate copolymer, ethylene-carboxylic acid unsaturated ester copolymer, a very-low density polyethylene, or a low density polyethylene. Particularly, in the case of using an inorganic metal (hydr)oxide, namely an inorganic filler or an inorganic flame retardant, it is desirable, in point of increase in the amount thereof used and affording good dispersion, to use a polar group-containing ethylene-unsaturated carboxylate copolymer or ethylene-carboxylic acid unsaturated ester copolymer where rubbery elasticity is required, it is desirable to use a rubbery substance, or when softening is merely required, there may be added a softening agent.

In the case where the resulting composition is required to have heat resistance, the use of polypropylene or a high-density polyethylene is preferred, and particularly the addition of poly-1-butene is preferred.

The melt flow rate (hereinafter referred to simply as "MFR") of the $C_2$–$C_8$ α-olefin (co)polymer used in the present invention is in the range of 0.01 to 50 g/10 min, the resulting composition will be deteriorated in both fluidity and formability, and if the MFR is higher than 50 g/10 min, the fluidity of the resulting composition will be too high and drawdown conspicuous, and the composition will be poor in its moldability. The degree of crosslinking is important for moldability. More particularly, crosslinking may result in deteriorated fluidity, greatly deteriorated moldability, or poor surface appearance. Therefore, a suitable degree of crosslinking may be selected according to the purpose of use of the resulting composition. In other words, the fluidity of the base resin and the amount of the crosslinking agent and that of the polyfunctional monomer to be used may be determined according to the purpose of use of the composition.

In the present invention, moreover, to the composition containing the partially crosslinked product obtained by the dynamic heat treatment there may be newly added the $C_2$–$C_8$ α-olefin copolymer (A) and/or the rubbery substance (B) as long as this addition does not depart from the gist of the present invention.

The following description is now provided about examples of components' proportions used in compositions applicable to concrete forming methods. But it is to be understood that these are examples and that the invention is not limited thereto.

For example, the thermoplastic resin composition for forming sheet or film in the second aspect of the present invention is attained by a thermoplastic resin composition containing a partially crosslinked product obtained by dynamically heat-treating 20–100 wt % of an ethylene (co)polymer and/or a polypropylene resin as $C_2$–$C_8$ α-olefin (co)polymer(s) (A) and 0–80 wt % of a rubbery substance (B) in the presence of the foregoing specific crosslinking agent and polyfunctional monomer.

Particularly, where flexibility is required, it is desirable to use as the ethylene (co)polymer a polymer or a copolymer selected from high pressure process low-density polyethylenes, ethylene-unsaturated carboxylate copolymers, ethylene-carboxylic acid unsaturated ester copolymer, very-low density polyethylenes, and linear low-density polyethylenes.

For some degree of softening, it is desirable to use a rubbery substance, and where further softening is required, it is desirable to use a softening agent in a amount up to 50 parts by weight based on 100 parts by weight of the components (A)+(B).

It is preferable that the amount of the rubbery substance be not larger than 80 wt %. An amount thereof exceeding 80 wt % is not desirable because of deteriorated moldability. As previously noted, however, there may be further added a $C_2$–$C_8$ α-olefin (co)polymer (A), provided adjustment should be made so that the content of the rubbery substance in the resulting composition as a final product is not higher than 80 wt %.

Also as to the amount of the softening agent, if it exceeds 50 parts by weight, there may occur bleeding to the surface. But, as mentioned previously, there may be further added a $C_2$–$C_8$ α-olefin (co)polymer (A) or a rubbery substance while adjusting so that the content of the softening agent in the composition as a final product is not larger than 50 wt %.

In the case where rigidity is required, it is desirable to use as the ethylene (co)polymer at least one member selected from the group consisting of poly-1-butene resins, polypropylene resins, high and medium density polyethylenes, linear low-density polyethylenes, and high pressure process polyethylenes.

The MFR of the above composition is not specially limited, but preferably it is not higher than 10 g/10 min, more preferably it is in the range of 0.01 to 5 g/10 min.

The crosslinking method used in the present invention is applicable also to a composition which substantially comprises polypropylene or polyethylene alone (e.g. 90 wt % or more). Although actually the crosslinking is to a slight extent, it is possible to attain the improvement of tensile strength and modification of film.

Thus, by slightly crosslinking a $C_2$–$C_8$ α-olefin (co)polymer such as a high pressure process low-density polyethylene, a linear low-density polyethylene, or a high-density polyethylene, as the ethylene (co)polymer, it is possible to improve the strength of film formed using the resulting composition. Further, when polyethylene resins having a large proportion of amorphous portion (e.g. ethylene-unsaturated carboxylate copolymers and ethylene-carboxylic acid unsaturated ester copolymer) are used each alone for the formation of film, these sometimes arise such problems as blocking and stickiness of the film. But these problems can be solved by using the crosslinking method as referred to herein. Among the above resins, the film forming resins are particularly preferred, but no limitation is placed on the kinds thereof. Even the use of a mixture will afford the desired effect.

The thermoplastic resin composition for pipe molding in the third aspect of the present invention can be attained by using as resin components 30–100 wt % of an ethylene (co)polymer and 0–70 wt % of a polypropylene resin and/or 0–70 wt % of a rubbery substance.

The MFR of this composition is not specially limited, but preferably it is not higher than 1, more preferably not higher than 0.5.

Where the pipe as product is required to have rigidity, it is necessary to use an ethylene (co)polymer in an amount of 30 wt % or more. High and medium density polyethylenes are most suitable are resins which are employable. In the case of adding a resin to these polymers for the adjustment of fluidity and of rigidity, there may be used any of other polyethylene resins, polypropylene resins and rubbery substances than those mentioned above.

When flexibility is required, it is desirable to use as the ethylene (co)polymer any of high pressure process low-density polyethylenes, very-low density polyethylenes, linear low-density polyethylenes, ethylene-unsaturated carboxylic ester copolymers, and ethylene-carboxylic acid unsaturated ester copolymer. A softening agent may be incorporated therein. Where further flexibility and impact resistance are required, it is desirable to use a rubbery substance. In point of moldability however, the amount of a rubbery substance is preferably not larger than 70 wt %.

In any case, by combining resin components and selecting a suitable degree of the crosslinking reaction in the invention there can be obtained a wide variety of compositions. For example, in comparison with rigid polyvinyl chloride used for water and gas pipes, high-density polyethylenes are inferior in mechanical strength, but by being slightly crosslinked according to the method of the present invention their mechanical strength can be improved without surface roughness or without deterioration of moldability or of environmental stress cruck rupture.

The thermoplastic resin composition for profile extrusion in the forth aspect of the present invention can be attained by using as resin components 30–100 wt % of an ethylene (co)polymer and/or polypropylene and 0–70 wt % of a rubbery substance.

The MFR of the this composition is not limited, but preferably it is not higher than 10, more preferably it is in the range of 0.01 to 5.

For example, a mud guard (target flexural modulus: 1,000 or so) can be obtained by using not less than 80 wt % of a very-low density polyethylene as the ethylene (co)polymer. For the balance 20 wt % it is desirable to use a polypropylene or a high-density polyethylene in the case where rigidity is to be improved, or use a rubbery substance when flexibility is to be imparted to the mud guard. In any case, it is desirable to use a resin having a high shape retaining property in a molten condition.

The thermoplastic resin composition for blow molding in the fifth aspect of the present invention can be attained by using as resin components 30–100 wt % of a polypropylene and/or an ethylene (co)polymer and 0–70 wt % of a rubbery substance.

The MFR of this composition, which is not limited, is preferably not higher than 5, more preferably not higher than 1.

Where rigidity is particularly required, it is desirable to use a polypropylene and/or a high-density polyethylene. For imparting flexibility to the composition it is desirable to use any of a high pressure process low-density polyethylene, a linear low-density polyethylene, ethylene-carboxylic acid unsaturated ester copolymer, an ethylene-unsaturated carboxylate copolymer, a very-low density polyethylene, a rubbery substance and a softening agent. In blow molding, there arise such problems as the surface roughness of parison and marked drawdown. Excess crosslinking will cause marked surface roughness, and if the proportion of polypropylene small in melt tension is large, conspicuous drawdown will result.

For example, in the case of a gasoline tank, impact- and heat-resistance and rigidity are important physical properties, so as the ethylene (co)polymer and/or polypropylene it is desirable to use a high-density polyethylene or a linear low-density polyethylene. As the high-density polyethylene it is particularly preferred to use one well balanced in both rigidity and low-temperature impact resistance. By crosslinking such high-density polyethylene to a slight extent there is attained improvement of its heat- and impact-resistance. The thus-improved polyethylene is very useful. Usually, a gasoline tank is fabricated by a multi-layer blow method using an engineering plastic having gas barrier property and a high-density polyethylene. But how to improve the bonding strength of the interface is an important subject.

In the present invention, by incorporating a polyfunctional monomer having a polar group such as a bismaleimide compound in the thermoplastic resin, the bonding strength of the interface is improved, and in some particular amount of a bismaleimide compound used it is not necessary to use an adhesive layer.

In the composition of the present invention there may be incorporated, if necessary, stabilizer, antioxidant, ultraviolet ray absorber, lubricant, foaming agent, antistatic agent, organic and inorganic flame retardants, plasticizer, dye, pigment, as well as fillers such as talc, calcium carbonate, carbon black, mica, glass fibers, carbon fibers, aramid resin, and asbestos.

According to the present invention, as set forth above, by using a crosslinking agent which, unlike the conventional crosslinking agents, does not give rise to such drawbacks as offensive odor, coloration and decomposition caused by the decomposition of the resin used, excess crosslinking, etc., there can be provided a thermoplastic resin composition for extrusion molding such as sheet molding, film molding, pipe molding, profile extrusion, or blow molding, superior in the balance between mechanical strength and moldability. Examples of extrudates obtained using the composition of the present invention include sheets for use in civil engineering and agricultural works, water-proof sheets, automobile interior materials typified by interior sheet, leather-like sheet, instrument panel and skin material, films formed by T-die method or inflation method, pipes for drainage, for cables, etc., such as corrugated pipes, lining pipes, straight pipes, cheeses, elbows and hoses, profile-extrusion products such as mud guards and window frames, and hollow products such as duct hoses, bellows pipes, seasoning containers and shampoo containers.

WORKING EXAMPLES AND COMPARATIVE EXAMPLES

The following examples are given to illustrate the present invention more concretely, but it is to be understood that the invention is not limited thereby.

Test pieces were produced for measuring the mechanical strength of resin compositions. More specifically, each test piece was obtained by punching to a predetermined size from a flat plate of 100 mm×200 mm×2 mm which had been formed by pressing, and the thus-punched piece was annealed prior to use.

How to Prepare Compositions

Compositions were prepared each by:

1) mixing resin(s), a crosslinking agent and a polyfunctional monomer at predetermined proportions by means of a Henschel mixer, and 2) melt-kneading the resulting mixture, using a twin-screw kneader/extruder (30 mm dia., a product of Plastic Kogaku Kenkyu-Sho K.K.), at a resin temperature of 180° to 260° C. and at a revolution of 200 rpm.

As necessary, a mineral oil- or synthetic oil-based softening agent was added from a reciprocating fixed displacement pump connected to a vent hole.

Testing and Measuring Method

MFR

According to JIS K6760 and K6758

Yield Tensile Strength, Ultimate Tensile Strength and Ultimate Elongation Length According to JIS K6760, K6758 and K7113.

Flexural Modulus

According to JIS K6758 and K7203.

Vicat Softening Temperature

According to JIS K6760, K6758 and K7206.

Izod Impact Value

According to JIS K6758 and K7110.

Boiling Xylene Insolubles Content

Film of 20 mm×50 mm×0.2 mm was formed by pressing, then placed in a 120-mesh wire gauze and then immersed in boiling xylene for 5 hours. The weight of the film before the immersion and that after the immersion were measured, and a boiling xylene insolubles content was determined from the following equation:

$$\text{Boiling xylene insolubles content}(\%) = \frac{\text{Weight (g) of film after immersion in boiling xylene}}{\text{Weight of film (g) before immersion in boiling xylene}} \times 100$$

Durometer Hardness, $H_DA$

According to ISO 868.

Permanent Set

According to JIS K6301. Stretched 100%, using No. 3 dumbbell.

The following resins were used:
(A): α-Olefin Copolymer
- ($A_1$) Polyethylene
  Prepared by a two-stage polymerization process. [η]=2.35. Density 0.948.
- ($A_2$) Polyethylene
  [η]=2.50. Density 0.952.
- ($A_3$) Very-low density polyethylene
  (trade name: Nisseki Softrex D9005, MFR=0.5, d=0.900).
- ($A_4$) Ethylene-ethyl acrylate copolymer
  (trade name: Nisseki Rexlon EEA A1040, MFR=0.3, a product of Nippon Petrochemicals Co., Ltd.).
- ($A_5$) Low-density polyethylene
  (trade name: Nisseki Rexlon F22, MFR=1.0, d=0.924, a product of Nippon Petrochemicals Co., Ltd.).
- ($A_6$) Very-low density polyethylene
  (trade name: Nisseki Softrex D9010, MFR=1.0, d=0.900).
- ($A_7$) High-density polyethylene
  (trade name: Nisseki Staflene E903(P), MFR=0.03, d=0.953, a product of Nippon Petrochemicals Co., Ltd.).
- ($A_8$) Etheylen-ethyl acrylate copolymer
  (trade name: Nisseki Rexlon EEA A4250, MFR=5.0, a product of Nippon Petrochemicals, Co., Ltd.).
- ($A_9$) Polypropylene
  (trade name: Nisseki Polypro F150H, MFR=9.0, d=0.90=0.91, a product of Nippon Petrochemicals Co., Ltd.).
- ($A_{10}$) Polypropylene
  (trade name: Nisseki Polypro E310G, MFR=0.5, d=0.90-0.91, a product of Nippon Petrochemicals Co., Ltd.).
- ($A_{11}$) Polypropylene
  (trade name: Nisseki Polypro J650G, MFR=8.0, d=0.90-0.91, a product of Nippon Petrochmicals, Co., Ltd.).
- ($A_{12}$) Polypropylene
  (trade name: Nisseki Polypro J630G, MFR=4.0, d=0.90-0.91, a product of Nippon Petrochemicals Co., Ltd.).

(B): Rubbery Substance
- ($B_1$) Ethylene-propylene diene random copolymer rubber
  (trade name: EP57P, $ML_{1+4}$=88, a product of Japan Synthetic Rubber Co., Ltd.).
- ($B_2$) Ethylene-propylene random copolymer rubber
  (trade name: EP02P, $ML_{1+4}$=24, a product of Japan Synthetic Rubber Co., Ltd.).
- ($B_3$) Ethylene-propylene random copolymer rubber
  (trade name: EP07P, $ML_{1+4}$=70, a product of Japan Synthetic Rubber Co., Ltd.).

Crosslinking Agent (C): Dihydroaromatic Compound
- ($C_1$) 2,2,4-Trimethyl-1,2-dihydroquinoline
  (trade name: Nocrac 224S, a product of Ohuchi Shinko Kagaku K.K.).
- ($C_2$) 9,10-Dihydrophenanthrene
  (a product of Tokyo Kasei K.K.).

Crosslinking Agent (D): Ether Compound
- ($D_1$) 3,4-Dihydro-2-pyran
  (a product of Tokyo Kasei K.K.).
- ($D_2$) Isopropenyl acetate (a product of Tokyo Kasei K.K.)

Crosslinking Agent (E): Tetrahydroaromatic Compound
- ($E_1$) 1,2,3,4-Tetrahydronaphthalene (a product of Tokyo Kasei K.K.).
- ($E_2$) Tetrahydrobenzene (a product of Tokyo Kasei K.K.).
- ($E_3$) Tetrahydrofuran (a product of Tokyo Kasei K.K.).

Crosslinking Agent (F): Cyclopentane Compound
- ($F_1$) Indene (a product of Tokyo Kasei K.K.)

Polyfunctional Monomer (G)
- ($G_1$) N,N'-m-Phenylene bismaleimide
  (trade name: Valnoc PM, a product of Ohuchi Shinko Kogaku K.K.).
- ($G_2$) Ethylene glycol dimethacrylate (a product of Tokyo Kasei K.K.).

Crosslinking Agent (J): Organic Peroxide
- ($J_1$) α,α'-Bis-(t-butylperoxy)-m-diisopropylbenzene (Perbutyl P, a product of Nippon Oils & Fats Co., Ltd.).

Softening Agent:
Super Oil C, a product of Nippon Oil Co., Ltd.

EXAMPLES 1-4, COMPARATIVE EXAMPLES 1-4 (BLOW MOLDING)

Each composition was extruded at a temperature of 200° C. and at a rate cf 15 g/sec, using a small-sized hollow molding machine (screw diameter: 40 mm) equipped with a die (die diameter: 34 mm, core diameter: 30 mm), and the resultant parison was observed.

Smooth state of parison was represented by "○" mark; extremely poor fluidity or marked surface roughness of parison was represented by "*" mark; and when drawdown was conspicuous and molding infeasible, this state was represented by "*" mark.

Measurement of Additional Physical Property

DSR (Die Swell Ratio)

Using a Koka type flow tester CFT-500 (a product of Shimadzu Seisakusho Ltd.), molten resin was extruded at 210° C. through a die (L/D) having a diameter of 2 mm and a length of 40 mm. This ratio is expressed as the ratio of the extrude diameter to the die diameter at a shear rate of 100 sec$^{-1}$.

Melt Tension (MT)

Using a melt tension tester manufactured by Toyo Seiki K.K. a polymer which had been melted at 190° C. within a cylinder (inside diameter: 9.55 mm) was extruded through an orifice (diameter: 2.10 mm, length: 8.00 mm) at a constant speed (piston falling speed: 20 mm/min), and melt tension is expressed as stress (unit: g) at 100 rpm of strand extruded through a load cell.

Environmental Stress Cracking Rupture (ESCR)

According to JIS K6760, using a 10 vol % solution of Liponox NCL as a test solution, the time taken until half the number of test pieces were cracked was measured.

EXAMPLES 5-7, COMPARATIVE EXAMPLES 5-7 (PIPE MOLDING)

Pipes were formed at 200° C. using a small-sized pipe forming machine (screw diameter: 40 mm) equipped with a straight die. The pipes were checked for the surface state during melting and after cooling. Smooth surface state was indicated by "○" mark, and extremely poor fluidity or marked surface roughness was indicated by "*" mark.

EXAMPLES 8-13, COMPARATIVE EXAMPLES 8-13

Sheets and Films Molding

100 μm thick films and 500 μm thick sheets were formed using a T-die machine (screw diameter: 50 mm). Also, 30 μm thick films were formed using an extruder (L/D=20) having a screw diameter of 40 mm, through a spiral die (diameter: 125 mm, lip: 1 mm), at a blow ratio of 1.8 and a processing temperature of 200° C. Smooth surface state was expressed by "○", and surface roughness or poor smoothness was expressed by "*" mark.

EXAMPLES 14, 15, COMPARATIVE EXAMPLES 14, 15

Profile Extrusion

Molten sheets were extruded through a T-die machine (screw diameter: 50 mm, lip: 5 mm) and then grained using grained cooling rolls to obtain 3 mm thick sheets. Smooth surface condition was represented by "○", while surface roughness or poor smoothness was represented by "*".

TABLE 1

Compositions for Blow Molding

| | Component (A) wt % | Component (B) wt % | Cross linking Agent part by weight | Polyfunctional Monomer part by weight | Softening Agent part by weight | MFR (g/10 min) (at 230° C.) | 100% Permanent Set (%) |
|---|---|---|---|---|---|---|---|
| Ex. 1 | A1:75, A2:25 | | C1:0.07 | G1:0.07 | | | |
| Comp. 1 | A1:75, A2:25 | | | | | | |
| Ex. 2 | A6:10, A11:66 | B1:25 | D1:0.50 | G2:0.50 | 10 | 0.1 | 37 |
| Comp. 2 | A6:10, A11:65 | B1:26 | | | 10 | 3 | 45 |
| Ex. 3 | A6:10, A12:57 | B2:33 | E1:0.80 | G1:0.90 | 20 | 0.1 | 38 |
| Comp. 3 | A6:10, A12:57 | B2:33 | J1:0.35 | | 20 | <0.1 | 32 |
| Ex. 4 | A10:30 | B3:70 | D1:0.50 | G2:0.60 | | | 11 |
| Comp. 4 | A10:30 | B3:70 | | | | | 15 |

| | Ultimate Tensile Strength (Kgf/cm$^2$) | Ultimate Elongation Length (%) | Izod Impact Strength (Kgf·cm/cm) | Die Swell Ratio (—) | Environmental Stress Cracking Rupture (hr) | Boiling Xylene Insolubles Content (%) | Surface State | Drawdown |
|---|---|---|---|---|---|---|---|---|
| Ex. 1 | | | 40 | 1.6 | 1700 | 14 | ○ | ○ |
| Comp. 1 | | | 33 | 1.5 | 1700 | 1 | ○ | ○ |
| Ex. 2 | 194 | 480 | NB | | | 20 | ○ | ○ |
| Comp. 2 | 180 | 400 | 11 | | | 1 | ○ | ○ |
| Ex. 3 | 155 | 480 | NB | | | 28 | ○ | ○ |
| Comp. 3 | 142 | 300 | NB | | | 39 | * | * |
| Ex. 4 | | | | | | 30 | ○ | ○ |
| Comp. 4 | | | | | | 1 | ○ | * |

Note: MFR values are at a load of 2.16 kg. Izod impact strength values are at −40° C. The surface state was observed in the state of parison and also in the state after bottle forming. When surface roughness was observed in either state, it was indicated by "*" mark. As to drawdown, when extreme thinning occurred upon extrusion of parison, this state was indicated by "*" mark.

TABLE 2

Compositions for Pipes Molding

| Component (A) wt % | Component (B) wt % | Cross-linking Agent part by weight | Polyfunctional Monomer part by weight | Softening Agent part by weight | MFR (g/10 min) (at 190° C.) |
|---|---|---|---|---|---|

TABLE 2-continued

| | | | | | | |
|---|---|---|---|---|---|---|
| Ex. 5 | A7:100 | | C1:0.03 | G1:0.05 | | 0.01 |
| Comp. 5 | A7:100 | | | | | 0.03 |
| Ex. 6 | A11:30, A3:5 | B1:65 | D1:0.5 | G1:0.5 | 30 | |
| Comp. 6 | A11:30, A3:5 | B1:65 | | | 30 | |
| Ex. 7 | A5:40 | B2:60 | E2:0.8 | G2:1.0 | 20 | 0.01 |
| Comp. 7 | A5:40 | B2:60 | J1:0.05 | | 20 | <0.01 |

| | Ultimate Tensile Strength (Kgf/cm$^2$) | Ultimate Elongation Length (%) | Environmental Stress Cracking (hr) | Boiling Xylene Insolubles Content (%) | Vicat Softening Point (°C.) | Molten Surface State | Surface State After Cooling |
|---|---|---|---|---|---|---|---|
| Ex. 5 | 300 | 900 | 1700 | 7 | | ○ | ○ |
| Comp. 5 | 270 | 900 | 1700 | 1 | | ○ | ○ |
| Ex. 6 | 60 | 600 | | 25 | 130 | ○ | ○ |
| Comp. 6 | 50 | 600 | | 1 | 120 | ○ | ○ |
| Ex. 7 | 50 | 500 | | 20 | 90 | ○ | ○ |
| Comp. 7 | 50 | 300 | | 40 | 92 | * | * |

Note: The values of Vicat softening point and of MFR were obtained at loads of 250 g and 2.16 kg, respectively.

TABLE 3

Compositions for Sheet or Film Molding

| | Component (A) wt % | Component (B) wt % | Cross-linking Agent part by weight | Polyfunctional Monomer part by weight | Softening Agent part by weight | Vicat Softening Point (°C.) | 100% Permanent Set (%) | 100% Tensile Strength (Kgf/cm$^2$) |
|---|---|---|---|---|---|---|---|---|
| Ex. 8 | A8:35 | B1:65 | F1:0.3 | G1:0.4 | 20 | | 13 | 35 |
| Comp. 8 | A8:35 | B1:65 | | | 20 | | 20 | 30 |
| Ex. 9 | A10:65, A7:10 | B2:25 | C2:0.5 | G1:0.5 | 10 | | 48 | 140 |
| Comp. 9 | A10:65, A7:10 | B2:25 | J1:0.08 | | 10 | | 48 | 130 |
| Ex. 10 | A10:30, A11:30 | B3:40 | D2:0.8 | G1:1.0 | 20 | | | 100 |
| Comp. 10 | A10:30, A11:30 | B3:40 | | | 20 | | | 85 |
| Ex. 11 | A10:70, A6:5 | | E3:0.5 | G1:0.5 | | | | |
| Comp. 11 | A10:70, A6:5 | | J1:0.08 | | | | | |
| Ex. 12 | A9:100 | | F1:0.8 | G2:1.0 | | 160 | | |
| Comp. 12 | A9:100 | | J1:0.05 | | | 150 | | |
| Ex. 13 | A5:100 | | C1:0.07 | G1:0.07 | | 109 | | |
| Comp. 13 | A5:100 | | J1:0.07 | | | 110 | | |

| | Ultimate Tensile Strength (Kgf/cm$^2$) | Ultimate Elongation Length (%) | Surface Hardness H$_D$A | Boiling Xylene Insolubles Content (%) | Surface State | Drawdown | Film Impact Strength | Remarks |
|---|---|---|---|---|---|---|---|---|
| Ex. 8 | 150 | 500 | 63 | 7 | ○ | ○ | | T-die film |
| Comp. 8 | 120 | 500 | 63 | 1 | ○ | * | | 100 μm |
| Ex. 9 | 170 | 600 | | 13 | ○ | ○ | | Sheet |
| Comp. 9 | 150 | 400 | | 23 | * | * | | 800 μm |
| Ex. 10 | 110 | 500 | 93 | 13 | ○ | ○ | | Sheet |
| Comp. 10 | 98 | 500 | 93 | 0 | ○ | ○ | | 800 μm |
| Ex. 11 | 230 | 200 | | 10 | ○ | ○ | | Sheet |
| Comp. 11 | 200 | 170 | | 25 | * | * | | 800 μm |
| Ex. 12 | 300 | 500 | | 7 | ○ | | 107 | Inflation film |
| Comp. 12 | 290 | 500 | | 1 | ○ | | 90 | 30 μm |
| Ex. 13 | 250 | 350 | | 8 | ○ | | | Inflation film |
| Comp. 13 | 240 | 300 | | 13 | Note | | | 30 μm |

Note: In the column "Surface State" of comparative Example 13, "Note" indicates that the tube burst. The values of Vicat Softening Point were obtained at a load of 1 kg. The tension test values in the working and comparative examples are characteristic values obtained under the forming method and thickness conditions mentioned in the remarks column.

TABLE 4

Compositions for Profile Extrusion

| | Component (A) wt % | Component (B) wt % | Cross-linking Agent part by weight | Polyfunctional Monomer part by weight | Vicat Softening Point (°C.) | Ultimate Tensile Strength (Kgf/cm$^2$) | Ultimate Elongation Length (%) | Flexural Modulus (Kgf/cm$^2$) | Boiling Xylene Insolubles Content (%) | Surface State |
|---|---|---|---|---|---|---|---|---|---|---|
| Ex. 14 | A3:100 | | C1:0.3 | G1:0.4 | 76 | 230 | 820 | 1300 | 10 | ○ |
| Comp. 14 | A3:100 | | | | 72 | 205 | 800 | 1300 | 1 | ○ |
| Ex. 15 | A12:35 | B1:65 | D:0.5 | G1:0.5 | | | | | 10 | ○ |
| Comp. 15 | A12:35 | B1:65 | J1:0.1 | | | | | | 30 | Note |

Note: In the column "Surface State" of Comparative Example 15, "Note" indicates surface roughness and sheet breakage. The values of Vicat softening point were obtained at a load of 1 kg.

What is claimed is:

1. A thermoplastic resin composition for extrusion molding containing a partially crosslinked product by dynamically heat-treating a composition consisting essentially of:
   (A) 100-1 wt % of an α-olefin (co)polymer of $C_2$ to $C_8$;
   (B) 0-99 wt % of a rubbery substance;
   0.01-7 parts by weight, based on 100 parts by weight of the components (A)+(B), of a crosslinking agent selected from the group consisting of:
   (C) a dihydroaromatic compound or a polymer thereof,
   (D) an ether compound,
   (E) a tetrahydroaromatic compound, and
   (F) a cyclopentane compound; in combination with
   (G) 0.01-7 parts by weight of a polyfunctional unsaturated monomer based on 100 parts by weight of the components (A)+(B).

2. A thermoplastic resin composition for sheet or film molding, containing a partially crosslinked product obtained by dynamically heat-treating a composition consisting essentially of:
   (A) 20-100 wt % of an ethylene (co)polymer and/or a polypropylene resin;
   (B) 0-80 wt % of a rubbery substance;
   0.01-7 parts by weight, based on 100 parts by weight of the components (A)+(B), of a crosslinking agent selected from the group consisting of:
   (C) a dihydroaromatic compound or a polymer thereof,
   (D) an ether compound,
   (E) a tetrahydroaromatic compound, and
   (F) a cyclopentane compound; in combination with
   (G) 0.01-7 parts by weight of a polyfunctional unsaturated monomer based on 100 parts by weight of the components (A)+(B).

3. A thermoplastic resin composition for pipe molding, containing a partially crosslinked product obtained by dynamically heat-treating a composition consisting essentially of:
   (A) 30-100 wt % of an ethylene (co)polymer, 0-70 wt % of a polypropylene resin, and/or
   (B) 0-70 wt % of a rubbery substance;
   0.01-7 parts by weight, based on 100 parts by weight of the components (A)+(B), of a crosslinking agent selected from the group consisting of:
   (C) a dihydroaromatic compound or a polymer thereof,
   (D) an ether compound,
   (E) a tetrahydroaromatic compound, and
   (F) a cyclopentane compound; in combination with
   (G) 0.01-7 parts by weight of a polyfunctional unsaturated monomer based on 100 parts by weight of the components (A)+(B).

4. A thermoplastic resin composition for profile extrusion, containing a partially crosslinked product obtained by dynamically heat-treating a composition consisting essentially of:
   (A) 30-100 wt % of an ethylene (co)polymer and/or a polypropylene resin;
   (B) 0-70 wt % of a rubbery substance;
   0.01-7 parts by weight, based on 100 parts by weight of the components (A)+(B), of a crosslinking agent selected from the group consisting of:
   (C) a dihydroaromatic compound or a polymer thereof,
   (D) an ether compound,
   (E) a tetrahydroaromatic compound, and
   (F) a cyclopentane compound; in combination with
   (G) 0.01-7 parts by weight of a polyfunctional unsaturated monomer based on 100 parts by weight of the components (A)+(B).

5. A thermoplastic resin composition for blow molding, containing a partially crosslinked product obtained by dynamically heat-treating a composition consisting essentially of:
   (A) 30-100 wt % of an ethylene (co)polymer and/or a polypropylene resin;
   (B) 0-70 wt % of a rubbery substance;
   0.01-7 parts by weight, based on 100 parts by weight of the components (A)+(B), of a crosslinking agent selected from the group consisting of:
   (C) a dihydroaromatic compound or a polymer thereof,
   (D) an ether compound,
   (E) a tetrahydroaromatic compound, and
   (F) a cyclopentane compound; in combination with
   (G) 0.01-7 parts by weight of a polyfunctional unsaturated monomer based on 100 parts by weight of the components (A)+(B).

6. A thermoplastic resin composition for extrusion molding as set forth in any of claims 1-5, wherein said α-olefin (co)polymer is at least one selected from the group consisting of polyethylene resins, polypropylene resins and poly-1-butene resins.

7. A thermoplastic resin composition for extrusion molding as set forth in any of claims 1 to 5, wherein the rubbery substance (B) is ethylene-propylene random copolymer rubber or ethylene-propylene-diene random copolymer rubber.

8. A thermoplastic resin composition for extrusion molding as set forth in any of claims 1 to 5, wherein the dihydroaromatic compound (C) is a 1,2-dihydroquinoline compound or a polymer thereof or 9,10-dihydrophenanthrene, the ether compound (D) is a dihydropyran or isopropenyl acetate, the tetrahydroaromatic compound (E) is 1,2,3,4-tetrahydronaphthalene, tetrahydrobenzene, or tetrahydrofuran, and the cyclopentane compound is indene.

9. A thermoplastic resin composition for extrusion molding as set forth in any of claims 1 to 5, wherein the polyfunctional unsaturated monomer is a bismaleimide compound or a di(meth)acrylate compound.

10. A thermoplastic resin composition for extrusion molding containing a partially crosslinked product obtained by dynamically heat-treating a composition consisting essentially of:
   (A) 100-1 wt % of at least one α-olefin (co)polymer selected from the group consisting of polyethylene resins, polypropylene resins and poly-1-butene resins;
   (B) 0-99 wt % of a rubbery substance selected from the group consisting of ethylene-propylene random copolymer rubber and ethylene-propylene-diene random copolymer rubber;
   0.01-7 parts by weight, based on 100 parts by weight of the components (A)+(B), of a crosslinking agent selected from the group consisting of:
   (C) a dihydroaromatic compound or a polymer thereof selected from the group consisting of a 1,2-dihydroquinoline compound or a polymer thereof and 9,10-dihydrophenanthrene;
   (D) an ether compound selected from the group consisting of dihydropyran and isopropenyl acetate;
   (E) a tetrahydroaromatic compound selected from the group consisting of 1,2,3,4-tetrahydronaphthalene, tetrahydrobenzene, and tetrahydrofuran; and
   (F) indene; in combination with
   (G) 0.01-7 parts by weight of a polyfunctional unsaturated monomer based on 100 parts by weight of the components (A)+(B), said polyfunctional unsaturated monomer selected from the group consisting of bismaleimide and a di(meth)acrylate compound.

* * * * *

UNITED STATES PATENT AND TRADEMARK OFFICE
CERTIFICATE OF CORRECTION

PATENT NO. : 5,223,566
DATED : June 29, 1993
INVENTOR(S) : Aida et al.

It is certified that error appears in the above-identified patent and that said Letters Patent is hereby corrected as shown below:

On the title page Item [75], after "Ibaragi" delete ", both" and insert in place thereof:

--; Masaaki Miyazaki, Yokohama, all--.

Signed and Sealed this

Fifteenth Day of March, 1994

Attest:

BRUCE LEHMAN

Attesting Officer

Commissioner of Patents and Trademarks